United States Patent [19]

Beard et al.

[11] Patent Number: 4,780,206

[45] Date of Patent: Oct. 25, 1988

[54] TURBULENCE CONTROL SYSTEM

[76] Inventors: Harold J. Beard; Raleigh L. Cox; Gary J. Beard; Mark B. Beard, all of P.O. Box 3838, Baton Rouge, La. 70821

[21] Appl. No.: 3,943

[22] Filed: Jan. 16, 1987

[30] Foreign Application Priority Data

Jun. 13, 1986 [EP] European Pat. Off. ........ 86304559.7

[51] Int. Cl.$^4$ .................................. B01D 21/08
[52] U.S. Cl. ............................ 210/521; 210/194; 210/320; 210/522; 210/926
[58] Field of Search ............ 210/926, 629, 626, 194, 210/320, 628, 534, 202, 521, 522

[56] References Cited

U.S. PATENT DOCUMENTS

| | | | |
|---|---|---|---|
| 4,303,516 | 12/1981 | Stensel et al. | 210/926 |
| 4,383,922 | 5/1983 | Beard | 210/926 |
| 4,446,018 | 5/1984 | Cerwick | 210/926 |
| 4,614,589 | 9/1986 | Weis | 210/926 |
| 4,634,526 | 1/1987 | Salkeld et al. | 210/521 |

FOREIGN PATENT DOCUMENTS 2329684 1/1975 Fed. Rep. of Germany ...... 210/320

*Primary Examiner*—Benoit Castel
*Attorney, Agent, or Firm*—Robert C. Tucker; William David Kiesel; Timothy J. Monahan

[57] ABSTRACT

A turbulence control system is provided comprising a first baffle, fixedly connected across the interior of an intra-channel clarifier having side walls between the side walls near the point of entry of wastewater into the clarifier, the first baffle covering a desired portion of the cross-sectional flow area within the clairifier; and a second baffle, fixedly connected across the interior of the clarifier between the side walls downstream of the first baffle and covering a desired portion of the cross-sectional flow area left uncovered by the first baffle. The turbulence control system may also comprise at least one accumulation baffle, connected between the side walls and near the bottom of the clarifier, the accumulation baffle extending upward to a desired height within the clarifier, but not so high as to produce a flow velocity which would impede settlement of sludge within the clarifier. Another possible feature of the turbulence control system comprises at least one guide vane, fixedly attached to the clarifier beneath its bottom and running parallel to the length of the clarifier. The turbulance control system may also comprise a pair of hinged wings mounted to the bow of the clarifier.

18 Claims, 2 Drawing Sheets

TURBULENCE CONTROL SYSTEM

BACKGROUND OF THE INVENTION

1. Field of the Invention

This invention relates generally to intra-channel clarifiers and, more particularly, to devices which limit or control turbulence within intra-channel clarifiers.

2. Prior Art

In oxidation ditch sewage treatment systems, intra-channel clarifiers are often employed. Examples of intra-channel clarifiers may be seen in Harold J. Beard's U.S. Pat. Nos. 4,362,625; 4,383,922 and 4,457,844. Such clarifiers function by utilizing the hydraulic head losses created by a moving stream of sewage as it passes around and/or under a stationary semi-submerged structure. Differential pressures between the interior and the exterior of the clarifier and reduced velocities within the clarifier accelerate settlement of sludge from the wastewater. Sludge is withdrawn from the bottom of the clarifier through a series of sludge removal ports of some type, and the clarified liquid is then removed from the clarifier.

A problem which has developed with some intra-channel clarifiers results from the fluid dynamics of particular clarifier/oxidation ditch configurations. In some situations, turbulence develops within the clarifier, hindering flocculation and settlement of sludge. The turbulence is generally caused by small eddy currents which are carried into the clarifier via entering wastewater. Turbulence may also be caused by reverse flow through sludge removal ports, causing settled sludge to puff up into clarified fluid. It is desirable to encourage early sludge settlement and removal at an early stage in the clarification process, in order to minimize the effects of turbulence.

SUMMARY OF THE INVENTION

Therefore, it is an object of this invention to provide a turbulence control system for intra-channel clarifiers which reduces turbulence within the clarifier and allows more efficient removal of sludge from the clarifier.

It is another object of this invention to provide a turbulence control system which helps to eliminate eddy currents in wastewater entering the clarifier.

It is still another object of this invention to provide a turbulence control system which helps to eliminate reverse flow through sludge removal ports.

It is a further object of this invention to provide a turbulence control system which allows adjustment of factors influencing hydraulic operation of an intra-channel clarifier while also reducing turbulence.

It is still a further object of this invention to provide a turbulence control system which will encourage the flow of sludge through sludge removal ports.

It is another object of this invention to provide a turbulence control system which accomplishes all of the above objectives.

Accordingly, a turbulence control system is provided comprising a first baffle, fixedly connected across the interior of an intra-channel clarifier having side walls between the side walls near the point of entry of wastewater into the clarifier, the first baffle covering a desired portion of the cross-sectional flow area within the clarifier; and a second baffle, fixedly connected across the interior of the clarifier between the side walls downstream of the first baffle and covering a desired portion of the cross-sectional flow area left uncovered by the first baffle. The turbulence control system may also comprise at least one accumulation baffle, connected between the side walls and near the bottom of the clarifier, the accumulation baffle extending upward to a desired height within the clarifier, but not so high as to produce a flow velocity which would impede settlement of sludge within the clarifier. Another possible feature of the turbulence control system comprises a guide vane, fixedly attached to the clarifier beneath its bottom and to the outside of the sludge removal ports and running parallel to the length of the clarifier. The turbulence control system may also comprise a pair of hinged wings mounted to the bow of the clarifier.

DETAILED DESCRIPTION OF PREFERRED EMBODIMENTS OF THE INVENTION

Figure 1:
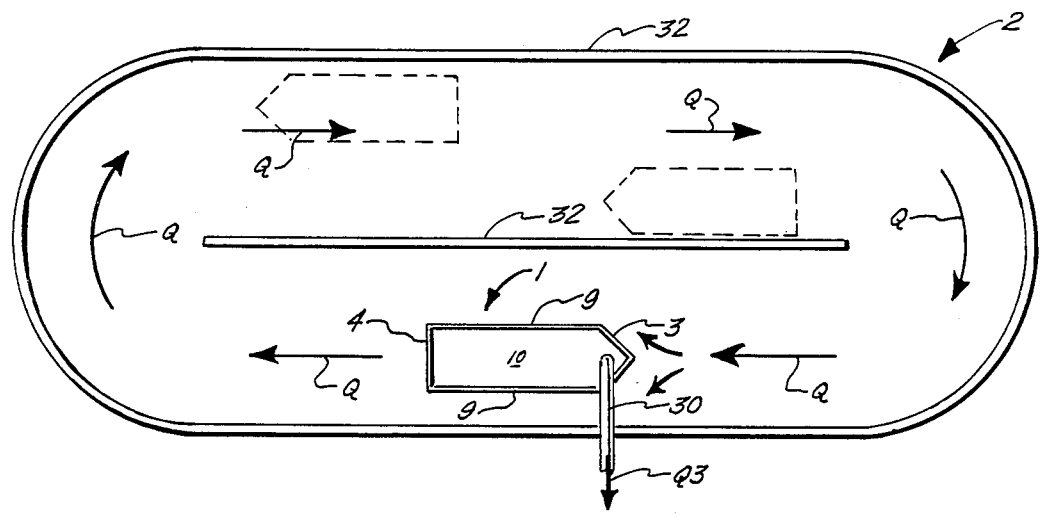
FIG. 1 is a top view of an intra-channel clarifier installed in an oxidation ditch.
Figure 2:
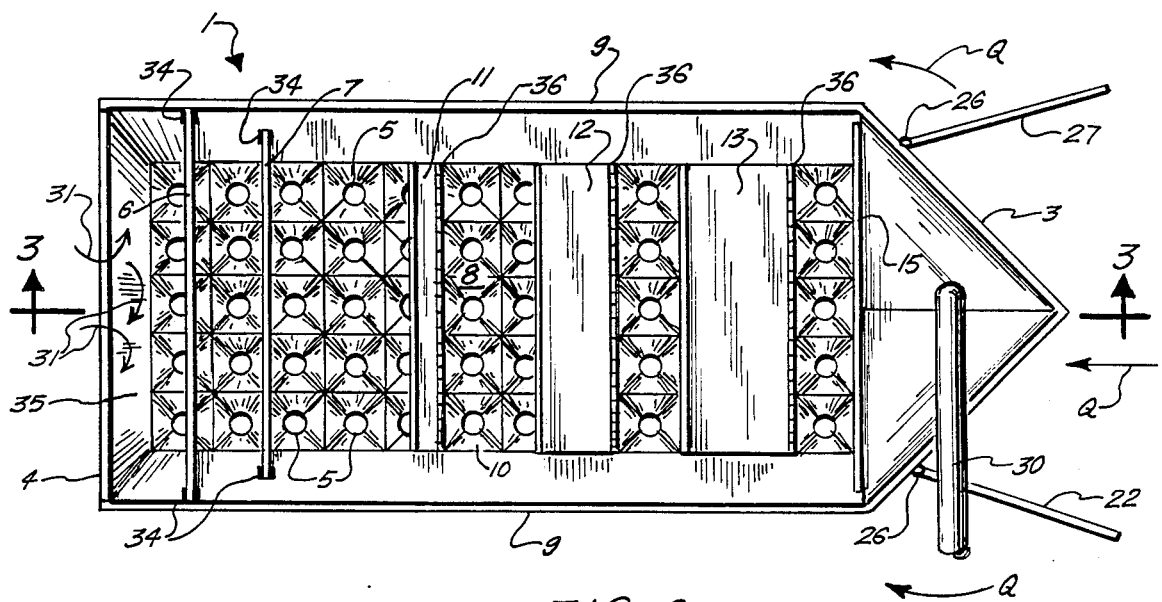
FIG. 2 is a top view of an intra-channel clarifier with a preferred embodiment of the invention attached thereto.

As shown in FIG. 1, an intra-channel clarifier 1 is positioned in an oxidation ditch 2 having flowing wastewater Q therein. In the embodiment shown in the figures, wastewater flow Q proceeds under, around and past the closed bow 3 of the clarifier 1. Clarifier 1 is provided with an open stern 4 and sludge removal ports 5 which connect the interior 8 of the clarifier 1 with the interior of oxidation ditch 2. As wastewater flow Q travels under and around the clarifier 1, hydraulic head differential (from both friction against the clarifier 1 and increased velocity) causes a pressure reduction in the area around the clarifier 1. Interior flow $Q_1$ (see FIG. 3) is established as wastewater behind the stern 4 flows into the clarifier 1 at point of entry 35. Interior flow $Q_1$ is at a much slower velocity (preferably less than 0.1 foot per second) than wastewater flow Q. As interior flow $Q_1$ moves slowly through the clarifier 1, particles of sludge 14 begin to settle toward the bottom 10. This settlement is further encouraged by total port flow $Q_2$ through sludge removal ports 5. Various numbers of sludge removal ports 5 may be required according to the desired flow dynamics for a particular oxidation ditch/clarifier system.

Total port flow $Q_2$ is established due to hydraulic head differential between the interior 8 of clarifier 1 and the wastewater flow beneath the bottom 10. Total port flow $Q_2$ is comprised of the sum of individual port flows $Q_5$ through sludge removal ports 5. Due to increasing head losses as wastewater flows from the bow 3 to the stern 4 of clarifier 1, individual port flows $Q_5$ increase from bow 3 to stern 4. Thus, sludge 14 is drawn from clarifier 1 and returned to the ditch 2 through sludge removal ports 5. Clarified wastewater flows toward bow 3 and is withdrawn through withdrawal line 30. Preferably, a clarifier baffle 15 is provided, over which the clarified wastewater flows. The withdrawal flow through withdrawal line 30 is indicated by $Q_3$. Thus, $Q_1 = Q_2 + Q_3$. While one embodiment of an intra-channel clarifier 1 is shown herein, the term "intra-channel clarifier" is intended to encompass any similar device employed in an oxidation ditch to remove solids from the effluent of the ditch.

As stated above, as interior flow $Q_1$ enters the stern 4 of clarifier 1 it is preferable that the velocity component of the flow be small. It is also preferred that any components of flow which are not parallel to the direction of interior flow $Q_1$ be removed. Any such non-parallel components could cause turbulence in interior flow $Q_1$, as indicated by non-parallel movements such as swirls 31. Due to the light weight of sludge 14, such turbulence will tend to hinder settlement. Turbulence may also be caused by non-parallel components of wastewater flow Q outside the clarifier 1. Such non-parallel components of wastewater flow Q will reduce the desired laminar nature of the flow beneath bottom 10. As wastewater flow Q moves around the clarifier 1, it has been found that a significant amount of flow is directed toward the sides 32 of oxidation ditch 2, as is indicated by non-laminar arrows 33. When this condition occurs it is possible that the desired head differential will not exist for some sludge removal ports 5, hindering the suction effect of those ports 5. It is even possible that, in a small number of ports 5, a flow in reverse of the desired individual port flow $Q_5$ may occur. When this condition exists, as is illustrated by reverse flow arrows $Q_r$, turbulence will be created in the interior 8 of clarifier 1 just above ports 5, causing settled sludge 14 to puff up into clarified wastewater and decreasing the efficiency of the clarifier 1.

Various means are employed by this invention to decrease turbulence and encourage sludge settlement and removal. The components of the invention may exist individually or in conjunction with each other in order to maximize turbulence reduction and sludge removal for a particular situation. In most cases, it is desirable to employ all of the components to provide a range of adjustment to suit varying conditions.

Figure 3:
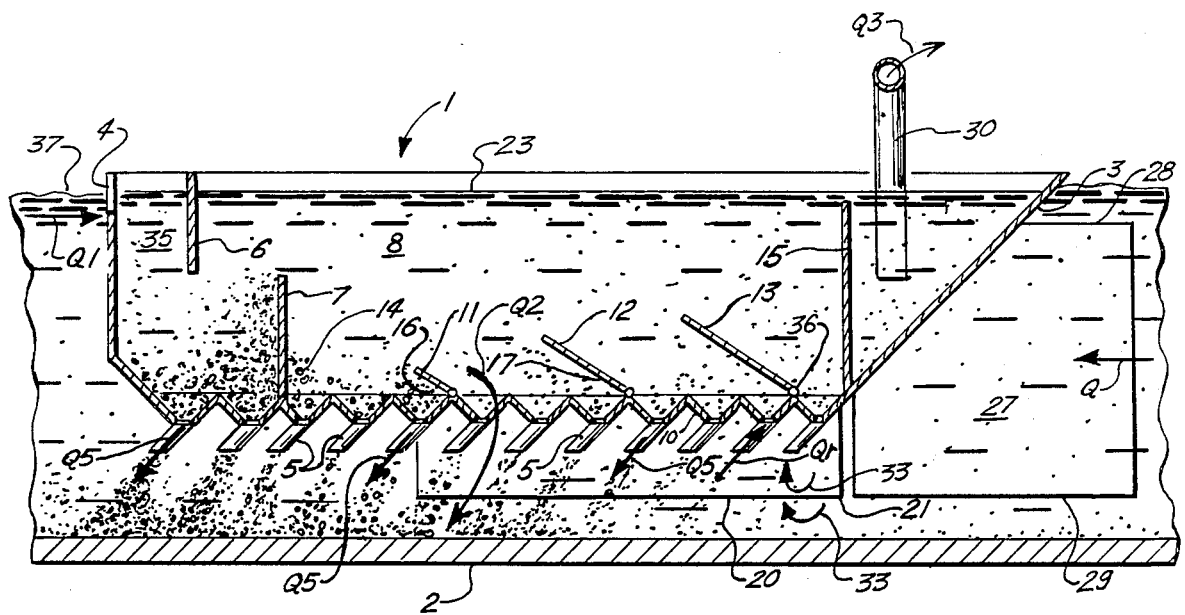
FIG. 3 is a sectional view along line 3—3 of FIG. 2.

First baffle 6 and second baffle 7 are fixedly connected across the interior 8 of the clarifier 1 between side walls 9. As shown in the Figures, first baffle 6 spans and covers a portion of the cross-sectional flow area within the clarifier near the point of entry 35 of wastewater into the clarifier 1. It is desirable that the amount of cross-sectional area covered by first baffle 6 be variable in order to control head losses within the clarifier 1. This can be accomplished easily, employing various means known in the art, such as slots 34 which allow baffles 6, 7 to be moved up and down. It is also preferable that first baffle 6 cover the upper portion of the cross-sectional flow area, as shown in FIG. 3. This arrangement serves to stop non-parallel currents from moving across the top surface 23 of the wastewater within the clarifier 1. Second baffle 7 is located downstream of first baffle 6 and also covers a desired portion of the cross-sectional flow area. It is preferable that second baffle 7 covers the area left uncovered by first baffle 6, establishing a smooth laminar flow in the direction of interior flow $Q_1$. Of course, the positions of first baffle 6 and second baffle 7 may be reversed where desired. Second baffle 7 may also be adjustable in the same manner as first baffle 6. First and second baffles 6 and 7 thus serve to dampen turbulence at the point of entry 35.

Settlement of sludge 14 is encouraged utilizing at least one accumulation baffle, such as first accumulation baffle 11, also connected between side walls 9. Accumulation baffles 11, 12, 13 also serve to dampen turbulence while providing a surface on which sludge 14 may settle, accumulate and slide down toward sludge removal ports 5. It is preferred that accumulation baffles be inclined so as to form an acute angle 16 with the bottom 10 of clarifier 1 on the upstream side 17 of each accumulation baffle 11, 12, 13. It is also preferably that acute angle 16 be between 45 degrees and 90 degrees. In order to permit adjustment for varying flow dynamics, accumulation baffles 11, 12, 13 may have adjustable acute angles 16 utilizing means such as pivotal connection 36.

It is imperative, however, that each accumulation baffle 11, 12, 13 not extend upward to a point which would produce a flow velocity which would impede sludge settlement. As stated previously, it is preferred that the flow velocity within the clarifier 1 not exceed 0.1 foot per second. In the embodiment shown in FIG. 3, three accumulation baffles 11, 12, 13 are employed. Second accumulation baffle 12 and third accumulation baffle 13 each extend progressively higher than the prior accumulation baffle. This is due to the profile of pressure loss around the clarifier 1. As wastewater flows around and under clarifier 1 the head loss increases from the bow 3 toward the stern 4 of the clarifier 1. Thus, the sludge removal ports 5 near the stern 4 will draw more flow than those ports 5 near the bow 3, and accumulation baffles 11, 12, 13 may extend higher as the velocity decreases toward the bow 3 of the clarifier. Of course, depending upon the size of the oxidation ditch 2 and flow requirements, the length of clarifier 1 may require more than the three accumulation baffles 11, 12, 13 shown.

Figure 4:
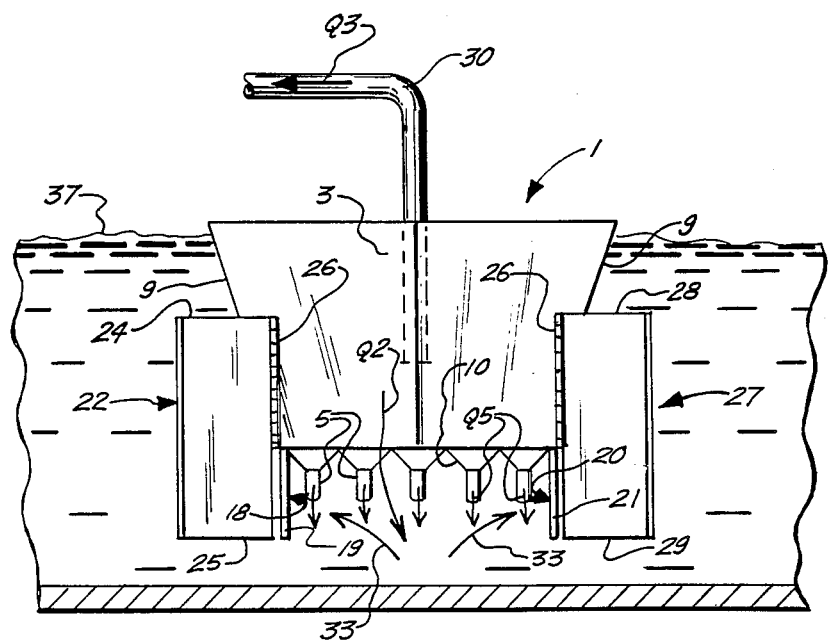
FIG. 4 is a front view of a preferred embodiment of the invention.

In order to prevent reverse flow $Q_r$ and to encourage smooth flow beneath clarifier 1, at least one guide vane 18, 20 is fixedly attached to clarifier beneath bottom 10. It is preferable that a first guide vane 18 run parallel to the length of clarifier 1 and be located to the outside of sludge removal ports 5, as shown in FIGS. 3, and 4. The first guide vane 18 has a first end 19 which is located in front of sludge removal ports 5, so as to deflect non-laminar flow 33 and urge flow parallel to the length of clarifier 1. Guide vanes 18, 29 may extend the length of clarifier 1, but should extend toward the stern 4 at least to a point where head loss from friction against the clarifier 1 is greater than head loss from increased velocity around the clarifier, establishing strong individual port flows $Q_5$. A second guide vane 20 is provided on the opposite side of clarifier 1 from first guide vane 18. Second guide vane 20 is also positioned parallel to the length of clarifier 1 outside of sludge removal ports 5 and has a first end 21 located in front of sludge removal ports 5. Additional guide vanes may be attached between first guide vane 18 and second guide vane 20 should further encouragement of laminar flow be necessary.

Further complementing guide vanes 18, 20 are wings 22, 27. Wings 22, 27 serve to further direct flow beneath sludge removal parts 5 to better establish individual port flows $Q_5$. First wing 22 is hingedly connected (via hinge 26) to the bow 3 of clarifier 1 and extends outwardly therefrom. Top edge 24 of first wing 22 is positioned just below exterior water surface 37 such that first wing 22 will not accumulate floating matter from the oxidation ditch 2. Bottom edge 25 preferably extends just below the lowermost portions of sludge removal ports 5. Second wing 27, having top edge 28 and bottom edge 29, is hingedly attached in a similar manner to bow 3 on the opposite side from first wing 22. Thus, wings 22, 27 may be opened toward or closed away from the sides 32 of ditch 2, aiding the establishment of laminar flow beneath clarifier 1. It is preferable that hinges 26 be aligned with first ends 19, 21 of guide vanes 18, 20 in order to maximize the effect of wings 22, 27.

As can be seen, an operator of an oxidation ditch system may vary the flow dynamics influencing an intra-channel clarifier 1 by utilizing first baffle 6, second baffle 7, accumulation baffles 11, 12, 13 guide vanes 18, 20 and wings 22, 27 either individually or in combination with each other. Of course, other embodiments of the invention will occur to those skilled in the art and are intended to be within the scope and spirit of the following claims.

I claim:

1. In an intra-channel clarifier having side walls, a bottom an a plurality of sludge removal ports in said bottom, a turbulence control system comprising:
   a. a first baffle, fixedly connected across the interior of an intra-channel clarifier having side walls and a bottom, between said side walls near the point of entry of wastewater into said clarifier; and
   b. a second baffle, fixedly connected across the interior of said clarifier between said side walls downstream of said first baffle; and wherein one of said first and second baffles covers a desired upper portion of the cross-sectional flow area within said clarifier at the location of said one of said first and second baffles and extending downward from the top surface of said wastewater within said clarifier, and the other of said first and second baffles covers a desired lower portion of the cross-sectional flow area within said clarifier at the location of said other of said first and second baffles and extending upward from said bottom.

2. A turbulence control system according to claim 1, wherein said first baffle covers the upper one-half of said flow area at said location of said second baffle and said second baffle covers the lower one-half of said flow area at said location of said second baffle.

3. A turbulence control system according to claim 1, wherein the position of said first baffle is adjustable so as to vary the cross-sectional flow area covered by said first baffle.

4. A turbulence control system according to claim 1, wherein the position of said second baffle is adjustable so as to vary the cross-sectional flow area covered by said second baffle.

5. In an intra-channel clarifier having side walls, a bottom and a plurality of sludge removal ports in said bottom, a turbulence control system comprising:
   a. a first baffle, fixedly connected across the interior of said clarifier between said walls near the point of entry of wastewater into said clarifier;
   b. a second baffle, fixedly connected across the interior of said clarifier between said side walls downstream of said first baffle; and wherein one of said first and second baffles covers a desired upper portion of the cross-sectional flow area within said clarifier at the location of said one of said first and second baffles and extending downward from the top surface of said wastewater within said clarifier, and the other of said first and second baffles covers a desired lower portion of the cross-sectional flow area within said clarifier at the location of said other of said first and second baffles and extending upward from said bottom;
   c. at least one accumulation baffle, connected between said side walls and near said bottom of said clarifier, said accumulation baffle extending upward to a desired height within said clarifier, but not so high as to produce a flow velocity which would impede settlement of sludge within said clarifier.

6. A turbulence control system according to claim 5, wherein each said accumulation baffle is inclined so as to form an acute angle with said bottom on the upstream side of said accumulation baffle.

7. A turbulence control system according to claim 6, wherein said acute angle is between forty-five degrees and ninety degrees.

8. A turbulence control system according to claim 5, wherein the position of said accumulation baffle is adjustable such that the angle formed between said accumulation baffle and said bottom is variable.

9. A turbulence control system according to claim 5, further comprising:
   d. a first guide vane, fixedly attached to said clarifier beneath said bottom and to the outside of said sludge removal ports and running parallel to the length of said clarifier and extending downward to a depth below the lowermost portion of said sludge removal ports, said first guide vane further having a first end, which is attached in front of said sludge removal ports; and
   e. a second guide vane, fixedly attached to said clarifier beneath said bottom opposite and parallel to said first guide vane to the outside of said sludge removal ports and extending downward to a depth below the lowermost portion of said sludge removal ports, said second guide vane further having a first end, which is attached in front of said sludge removal ports.

10. A tubulence control system according to claim 9, further comprising:
    f. a first wing, hingedly connected to said bow of said clarifier and extending outward from said clarifier, said first wing having a top edge positioned below the surface of said stream and a bottom edge positioned below the lowermost portion of said sludge removal ports; and
    g. a second wing, hingedly connected to said bow of said clarifier opposite said first wing and extending outward from said clarifier opposite said first wing and extending outward from said clarifier, said second wing having a top edge positioned below the surface of said stream and a bottom edge positioned below the lowermost portion of said sludge removal ports.

11. A turbulence control system according to claim 10, wherein the position of said first baffle is adjustable so as to vary the cross-sectional flow area covered by said first baffle.

12. A turbulence control system according to claim 10, wherein the position of said second baffle is adjustable so as to vary the cross-sectional flow area covered by said second baffle.

13. A turbulence control system according to claim 10, wherein each said accumulation baffle is inclined so as to form an acute angle with said bottom on the upstream side of said accumulation baffle.

14. A turbulence control system according to claim 13, wherein said acute angle is between forty-five degrees and ninety degrees.

15. A turbulence control system according to claim 10, wherein the position of said accumulation baffle is adjustable such that the angle formed between said accumulation baffle and said bottom is variable.

16. In an intra-channel clarifier having side walls, a bottom and a plurality of sludge removal ports in said bottom, a turbulence control system comprising:
   a. a first guide vane, fixedly attached to said clarifier beneath said bottom and to the outside of said sludge removal ports and running parallel to the length of said clarifier and extending downward to a depth below the lowermost portion of said sludge removal ports, said first guide vane further having a first end, which is attached in front of said sludge removal ports; and
   b. a second guide vane, fixedly attached to said clarifier beneath said bottom opposite and parallel to said first guide vane to the outside of said sludge removal ports and extending downward to a depth below the lowermost portion of said sludge removal ports, said second guide vane further having a first end, which is attached in front of said sludge removal ports.

17. In an intra-channel clarifier having side walls, a bottom, a bow, a plurality of sludge removal ports in said bottom and is semi-submersible in a flowing liquid stream, a turbulence control system comprising:
   a. a first wing, hingedly connected to said bow of said clarifier and extending outward from said clarifier, said first wing having a top edge positioned below the surface of said stream and a bottom edge positioned below the lowermost portion of said sludge removal ports; and
   b. a second wing, hingedly connected to said bow of said clarifier opposite said first wing and extending outward drom said clarifier, said second wing having a top edge positioned below the surface of said stream and a bottom edge positioned below the lowermost portion of said sludge removal ports.

18. In an intra-channel clarifier having side walls, a bottom and a plurality of sludge removal ports in said bottom, a turbulence control system comprising at least one guide vane, fixedly attached to said clarifier beneath said bottom and running parallel to the length of said clarifier and extending downward to a depth below the lowermost portion of said sludge removal ports.

* * * * *